US000001539H

United States Statutory Invention Registration [19]

[11] Reg. Number: H1539

[45] Published: Jun. 4, 1996

Mahagaokar et al.

[54] METHOD OF REDUCING HYDROGEN CHLORIDE IN SYNTHESIS GAS

[75] Inventors: Uday Mahagaokar, Houston; Egon L. Doering, Pasadena; Phillip E. Unger, Houston, all of Tex.

[73] Assignee: Shell Oil Company, Houston, Tex.

[21] Appl. No.: 153,591

[22] Filed: Nov. 12, 1993

[51] Int. Cl.[6] ..... C01B 3/02

[52] U.S. Cl. ..... 423/240 R

[58] Field of Search ..... 423/240 R

[56] References Cited

U.S. PATENT DOCUMENTS

| | | | |
|---|---|---|---|
| 4,018,868 | 4/1977 | Knight | 423/244 |
| 4,062,926 | 12/1977 | Knight | 423/244 |
| 4,343,631 | 8/1982 | Ciliberti | 55/302 |
| 4,468,376 | 8/1984 | Suggitt | 423/358 |
| 4,681,045 | 7/1987 | Dvirka et al. | 110/345 |
| 4,767,605 | 8/1988 | Lindbauer et al. | 423/239.1 |
| 4,839,147 | 6/1989 | Lindbauer et al. | 423/239.1 |
| 4,857,285 | 8/1989 | Gal | 423/230 |
| 4,859,438 | 8/1989 | Lindabuer et al. | 423/239.1 |
| 4,908,195 | 3/1990 | Wanner et al. | 423/239.1 |
| 5,118,480 | 6/1992 | Cook et al. | 423/239.1 |

FOREIGN PATENT DOCUMENTS

| | | |
|---|---|---|
| 314253 | 5/1989 | European Pat. Off. . |
| 468540 | 1/1992 | European Pat. Off. . |
| 463367 | 1/1992 | European Pat. Off. . |
| 573209 | 12/1993 | European Pat. Off. . |
| 2106532 | 4/1983 | United Kingdom . |

OTHER PUBLICATIONS

Search Report of Feb. 7, 1995.

*Primary Examiner*—Charles T. Jordan
*Assistant Examiner*—John R. Hardee
*Attorney, Agent, or Firm*—Timothy J. Hadlock

[57] ABSTRACT

The invention is a method for reducing the hydrogen chloride content of a synthesis gas stream by (a) gasifying a carbonaceous feed material in an entrained flow gasifier to produce a gas/solids mixture of hydrogen, carbon monoxide, hydrogen chloride gas, and flyslag particles; (b) passing the gas/solids mixture solids removal zone where at least a portion of the flyslag particles are removed, to produce a gas stream; (c) mixing with the gas stream an alkali metal oxide, hydroxide, bicarbonate, or carbonate to produce a metals/gas mixture; (d) passing the metals/gas mixture to a ceramic candle filter; (e) reacting on the surface of the ceramic candle filter the alkali metal compounds with the hydrogen chloride to produce solid alkali metal chloride; and (f) recovering a gas stream from the ceramic candle filter substantially free of hydrogen chloride and solids.

15 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF REDUCING HYDROGEN CHLORIDE IN SYNTHESIS GAS

I. FIELD OF THE INVENTION

The invention relates to a method for reducing halide content, especially hydrogen chloride content, of a synthesis gas stream.

II. BACKGROUND OF THE INVENTION

The combustion of a carbonaceous material such as a solid carbonaceous fuel by reaction with a source of gaseous oxygen is well known. In such a reaction, an amount of air or oxygen equal to or greater than that required for complete combustion is used, whereby the gaseous effluent contains carbon dioxide with little, if any, carbon monoxide. It is also known to carry out the gasification or partial oxidation of solid carbonaceous materials or fuels employing a limited quantity of oxygen or air so as to produce primarily carbon monoxide and hydrogen.

Fuel sources, particularly coals, often have an undesirable halide content. The halogens in halides, such as chlorine in chlorides, form acids in the synthesis gas mixture which can cause severe corrosion in the downstream processing equipment. The halides also pose environmental and safety hazards if emitted to the atmosphere.

Another problem caused by the halides is reduced efficiency of the gasification process. Condensation of some salts in the synthesis gas during cooling limits the overall efficiency of the heat recovery from the synthesis gas. This limitation in heat recovery occurs because some moderate sublimation temperature salts, such as ammonium chloride, are very corrosive when permitted to condense. Thus, to avoid having the salts condense, the synthesis gas cannot be cooled below the sublimation temperature of various salts. Since the temperature to which the synthesis gas may be cooled is thus limited, the heat recovery from the gas is accordingly limited. Chlorine-containing salts are formed due to the presence of HCl. By removing HCl from the synthesis gas, formation of such salts in the gas stream is reduced or eliminated and the gas can be cooled further to permit more thermal recovery.

A prior known method of removing HCl is by a wet absorption system. In that method the synthesis gas must be cooled and passed through an aqueous absorption column. The HCl is absorbed in the water and neutralized with NaOH. This method has drawbacks since cooling the gas to remove the HCl is inefficient and results in heat/energy loss. Also, additional equipment costs and maintenance costs result from the addition of an absorption column to the process. Economic drawbacks also result from the need for a large water treatment plant due to a buildup of salts in the water from the absorption column.

It is known from U.S. Pat. No. 5,118,480 to add metal-containing compounds such as nahcolite to a synthesis gas downstream of the gasifier to remove HCl in conjunction with removing sulfur with a metal oxide sorbent. However, this process fails to address the problem of high expense associated with long piping necessary to have sufficient residence time for complete reaction.

It would be advantageous to have a practical and economical dry method of removing the halides, without the high expense of long piping.

III. SUMMARY OF THE INVENTION

The invention is a method for reducing the hydrogen chloride content of a synthesis gas stream including the steps of:

(a) gasifying a carbonaceous feed material in an entrained flow gasifier under gasifying conditions thereby producing a gas/solids mixture comprising hydrogen, carbon monoxide, hydrogen chloride gas, and flyslag particles;

(b) passing the gas/solids mixture to a solids removal zone wherein at least a portion of the flyslag particles are removed, thereby producing a gas stream;

(c) mixing with the gas stream an alkali metal compound including at least one oxide, hydroxide, bicarbonate, or carbonate, of sodium or potassium, thereby producing a metals/gas mixture;

(d) passing the metals/gas mixture to a ceramic candle filter;

(e) reacting on the surface of the ceramic candle filter the alkali metal compounds, or thermal decomposition products thereof, with the hydrogen chloride thereby producing solid alkali metal chloride, wherein a cake of solids builds up on the surface of the ceramic candle filter thereby increasing the contact time between the hydrogen chloride and the alkali metal compounds or their thermal decomposition products;

(f) periodically removing at least a portion of the cake of solids; and (g) recovering from the ceramic candle filter a gas stream substantially free of hydrogen chloride.

IV. DETAILED DESCRIPTION OF THE EMBODIMENTS

A. Feeds and Metal Compounds and Mixture Thereof

Several types of carbonaceous materials are suitable as feed sources for gasification. These include bituminous coal, sub-bituminous coal, anthracite coal, lignite, liquid hydrocarbons, petroleum coke, various organic scrap materials, municipal refuse, solid organic refuse contaminated with radioactive materials, paper industry refuse, and photographic scrap. Coal and petroleum coke are preferred feeds in this invention.

The metal compounds are alkali compounds. These include potassium oxide, potassium hydroxide, potassium bicarbonate, potassium carbonate, sodium oxide, sodium hydroxide, sodium bicarbonate, and sodium carbonate. Nahcolite, a naturally occurring form of sodium bicarbonate, is preferred for its economy and availability. The metal compounds are optionally used individually or in combination.

The metal compounds are mixed with the synthesis gas after the synthesis gas leaves the gasifier. The metal compound is injected, preferably dry, into the synthesis gas stream. It is transported pneumatically in nitrogen or carbon dioxide or in any other conventional dry feed manner. Preferably, at least a portion of the sensible heat of the synthesis gas is recovered prior to adding the metal compound. More preferably, the synthesis gas passes through a first heat recovery zone, a solids removal zone, then a second heat recovery zone, and then the metal compound is injected into the gas stream recovered from the second heat recovery zone.

The solids removal stage is preferably a cyclone or ceramic candle filter, used individually or in combination. An electrostatic precipitator is optionally used where the system pressure is at or near atmospheric. Preferably, the maximum amount of sensible heat is recovered which does not reduce the temperature of the synthesis gas below the condensation point of any chloride compounds present in the synthesis gas. Such condensation results in equipment corrosion problems.

B. Reaction, Cooling, and Solids Removal

After the metal compound is injected it will react with the chlorine in the hydrogen chloride to form a solid salt. The metal compound either reacts directly with the hydrogen chloride or the metal compound may first thermally decompose prior to such reaction. Where the metal compound is a sodium compound, e.g., sodium bicarbonate, sodium chloride is formed. The resulting metal chloride is a solid.

The solid-salt-containing synthesis gas stream then passes to a ceramic candle filter. Additionally, much of the reaction between the metal compound and the hydrogen chloride occurs on the upstream surface of the ceramic candle filter. This is because the residence time between the point of metal compound injection and the filter will typically be too short for complete reaction. Extension of the pathway to increase the residence time would be uneconomical.

A cake of salt solids builds up on the surface of the ceramic candle filter. For the synthesis gas to get through the cake to exit the filter, it must travel a convoluted pathway through the solids cake. Thus, the contact time between the hydrogen chloride and the alkali metal compounds or their thermal decomposition products is increased to provide a longer effective residence time without the uneconomical expense of lengthening the piping.

The synthesis gas recovered from the ceramic candle filter has reduced amounts of halides, e.g., hydrogen chloride, and is preferably substantially free of halides, e.g., hydrogen chloride. Preferably, the synthesis gas is then passed to a third heat recovery zone, to maximize sensible heat recovery before passing the synthesis gas to any wet cleanup units, such as a sulfur removal scrubbing unit.

C. Concentrations of Halides, Ratios, and Percent Removal

In the reducing atmosphere and elevated temperatures of the gasifier, the chloride in the coal evolves into hydrogen chloride. The initial concentrations of hydrogen chloride and other halides in the synthesis gas vary widely with the type and source of the feed to the gasifier. Chloride concentrations in coal range from about 0.01% by weight chlorine to about 0.35% by weight chlorine. Other halide concentrations in coal are typically much lower than chloride concentrations.

At least a stoichiometric amount of metal compounds must be mixed with the synthesis gas with respect to the halide concentration in the synthesis gas. Preferably, one to three times the stoichiometric ratio is used of metal compounds to halides, e.g., chlorides. This assures a high degree of removal of the chlorides. More than about three times the stoichiometric ratio is wasteful of metal compounds and makes the process uneconomical without any apparent benefit.

From about 95% by weight to about 99% by weight of the halides, e.g., chlorides, are removed in the practice of this method. For example, the synthesis gas will initially contain from about 10 ppm by volume (ppmv) to about 1000 ppmv chloride where the feed is coal. After gasification and reaction and solids removal of the metal halides, the concentration of chloride in the synthesis gas is from about 0.1 ppmv to about 5 ppmv.

D. Operating Conditions

The gasifier is operated at gasifying conditions. These conditions may vary from feed to feed. The temperature is a temperature high enough to gasify a substantial portion of the carbonaceous feed and to prevent the formation of undesirable side-products, such as tars and phenols and other aromatics. Typical temperatures in the gasifier are from about 1100° C. to about 2000° C. Where the feed is coal, the gasifier temperature is preferably from about 1450° C. to about 1575° C. More preferably, the temperature is from about 1425° C. to about 1510° C. The pressure of the gasifier is from about 200 psig to about 600 psig. Preferably the pressure is from about 300 psig to about 450 psig.

At the point of injection of the alkali metal compound the synthesis gas temperature is above the point at which any corrosive ammonium halide compounds, such as ammonium chlorides, will condense. This temperature varies with the type and concentration of halide compound. This is typically at least about 300° F. The temperature at the point of injection, however, is preferably not above the condensation point of sodium chloride. This is typically below about 1200° F. This limitation is necessary since sodium chloride must be a solid to be removed by the ceramic candle filter. It is not essential, however, that the temperature at the point of injection be above the point of condensation of sodium chloride, so long as the mixture reaches this temperature prior to reaching the upstream surface of the ceramic candle filter. Preferably the temperature of the synthesis gas stream at the point of metal compound injection is from about 350° F. to about 700° F., more preferably from about 450° F. to about 500° F.

What is claimed is:

1. A method for reducing the hydrogen chloride content of a synthesis gas stream comprising:

(a) gasifying a carbonaceous feed material in an entrained flow gasifier under gasifying conditions thereby producing a gas/solids mixture comprising hydrogen, carbon monoxide, hydrogen chloride gas, and flyslag particles;

(b) passing said gas/solids mixture to a solids removal zone wherein at least a portion of said flyslag particles are removed, thereby producing a gas stream;

(c) admixing with said gas stream an alkali metal compound comprising at least one oxide, hydroxide, bicarbonate, or carbonate, of sodium or potassium, thereby producing a metals/gas mixture;

(d) passing said metals/gas mixture to a ceramic candle filter;

(e) reacting on the surface of said ceramic candle filter said alkali metal compounds, or thermal decomposition products thereof, with said hydrogen chloride thereby producing solid alkali metal chloride, wherein a cake of solids builds up on the surface of said ceramic candle filter thereby increasing the contact time between said hydrogen chloride and said alkali metal compounds or their thermal decomposition products;

(f) periodically removing at least a portion of said cake of solids; and (g) recovering from said ceramic candle filter a gas stream substantially free of hydrogen chloride.

2. The method according to claim 1 wherein the carbonaceous feed material is coal.

3. The method according to claim 2 wherein the amount of alkali metal compounds admixed with the effluent of said solids removal zone is at least a stoichiometric amount of alkali metal compounds with respect to the hydrogen chloride content of the synthesis gas.

4. The method according to claim 3 wherein the amount of alkali metal compounds admixed with the effluent of said solids removal zone is not more than about 3 times the stoichiometric amount of alkali metal compounds with respect to the hydrogen chloride content of the synthesis gas.

5. The method according to claim 2 wherein said coal is a bituminous coal and wherein said admixing step (c) consists essentially of injecting said alkali metal compound into said effluent of said solids removal zone.

6. The method according to claim 3 wherein said coal is a sub-bituminous coal and wherein said alkali metal compound is sodium bicarbonate and wherein in admixing step (c) said sodium bicarbonate is dry at the point of admixture.

7. A method for reducing the hydrogen chloride content of a synthesis gas stream comprising:

(a) gasifying a carbonaceous feed material in an entrained flow gasifier under gasifying conditions thereby producing a gas/solids mixture comprising hydrogen, carbon monoxide, hydrogen chloride gas, and flyslag particles;

(b) passing said gas/solids mixture to a first heat recovery zone wherein a portion of the sensible heat of the gas/solids mixture is recovered;

(c) passing said gas/solids mixture to a solids removal zone wherein substantially all of said flyslag particles are removed, thereby producing a gas stream;

(d) passing said gas stream to a second heat recovery zone wherein a portion of the sensible heat of the gas stream is recovered;

(e) admixing with the effluent of said second heat recovery zone a sodium compound comprising at least one oxide, hydroxide, bicarbonate, or carbonate of sodium, thereby producing a sodium/gas mixture;

(f) passing said sodium/gas mixture to a ceramic candle filter;

(g) reacting on the upstream surface of said ceramic candle filter said sodium compounds, or thermal decomposition products thereof, with said hydrogen chloride thereby producing solid sodium chloride, wherein a cake of sodium chloride builds up on the upstream surface of said ceramic candle filter thereby increasing the contract time between hydrogen chloride and said sodium compounds or thermal decomposition products thereof;

(h) periodically removing at least a portion of said cake of sodium chloride;

(i) recovering a gas stream effluent from said ceramic candle filter substantially free of hydrogen chloride; and (j) passing said substantially-hydrogen-chloride-free gas stream to a third heat recovery zone wherein a portion of the sensible heat of the gas stream substantially free of hydrogen chloride is recovered.

8. The method according to claim 7 wherein the temperature in the gasifier is from about 1100° C. to about 2000° C.

9. The method according to claim 8 wherein the temperature in the gasifier is from about 1450° C. to about 1575° C.

10. The method according to claim 8 wherein the pressure in the gasifier is from about 200 psig to about 600 psig.

11. The method according to claim 9 wherein the pressure in the gasifier is from about 300 psig to about 450 psig.

12. The method according to claim 7 wherein the carbonaceous material is a bituminous or sub-bituminous coal, the alkali metal compound is sodium bicarbonate, and wherein prior to gasification the coal contains from about 0.01% by weight chlorine to about 0.35% by weight chlorine based on the coal as received and from about 95% by weight to about 99% by weight of the chlorine is removed in the ceramic candle filter in the form of sodium chloride.

13. The method according to claim 12 wherein prior to the reaction of the sodium carbonate or sodium oxide with the hydrogen chloride the gas stream contains from about 10 ppmv to about 1000 ppmv chlorine based on the gas volume and after the gas stream is recovered from said ceramic candle filter the gas contains from about 0.1 ppmv to about 5 ppmv of chlorine based on the gas stream.

14. The method of claim 7 wherein the carbonaceous feed is petroleum coke.

15. A method for reducing the hydrogen chloride content of a synthesis gas stream comprising:

(a) gasifying a bituminous or sub-bituminous coal in an entrained flow gasifier at a temperature from about 1450° C. to about 1575° C. and wherein the pressure in the gasifier is from about 300 psig to about 450 psig, thereby producing a synthesis gas mixture comprising hydrogen, carbon monoxide, hydrogen chloride gas, and flyslag particles;

(b) passing said synthesis gas mixture to a first heat recovery zone wherein a portion of the sensible heat of the synthesis gas mixture is recovered;

(c) passing said synthesis gas mixture to a first solids removal zone wherein substantially all of said flyslag particles are removed and recovering the synthesis gas from said solids removal zone, thereby producing a gas stream;

(d) passing said gas stream to a second heat recovery zone wherein a portion of the sensible heat of the gas stream is recovered;

(e) injecting nahcolite into said gas stream for admixture therewith;

(f) substantially decomposing said nahcolite to sodium carbonate and sodium oxide, thereby producing a sodium/gas mixture comprising hydrogen, carbon monoxide, hydrogen chloride, sodium carbonate, and sodium oxide;

(g) passing said sodium/gas mixture to a ceramic candle filter;

(h) reacting on the upstream surface of said ceramic candle filter said sodium carbonates and sodium oxides with said hydrogen chloride thereby producing solid sodium chloride, wherein a cake of solid sodium chloride builds up on the upstream surface of said ceramic candle filter thereby increasing the contact time between hydrogen chloride and said sodium carbonates or sodium oxides;

(i) periodically removing at least a portion of said cake of sodium chloride;

(j) recovering from said ceramic candle filter a gas stream substantially free of hydrogen chloride; and (k) passing said gas stream substantially free of hydrogen chloride to a third heat recovery zone wherein a portion of the sensible heat of the substantially-hydrogen-chloride-free gas stream is recovered.

* * * * *